(12) United States Patent
Dutta

(10) Patent No.: US 6,681,246 B1
(45) Date of Patent: Jan. 20, 2004

(54) METHOD, SYSTEM, AND PROGRAM FOR AUTOMATICALLY PROCESSING PUSHED INFORMATION WITHOUT SUBSCRIBER INVOLVEMENT

(75) Inventor: Rabindranath Dutta, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/553,809

(22) Filed: Apr. 21, 2000

(51) Int. Cl.[7] .............................. G06F 15/16
(52) U.S. Cl. .................. 709/206; 709/202; 709/203; 709/217; 709/219
(58) Field of Search ............... 709/202, 206, 709/217, 203, 219

(56) References Cited

U.S. PATENT DOCUMENTS

| | | | |
|---|---|---|---|
| 5,862,325 A | 1/1999 | Reed et al. | |
| 5,893,091 A | 4/1999 | Hunt et al. | |
| 5,987,454 A | 11/1999 | Hobbs | |
| 6,061,506 A | * 5/2000 | Wollaston et al. | 703/23 |
| 6,148,330 A | * 11/2000 | Puri et al. | 709/217 |
| 6,192,258 B1 | * 2/2001 | Kamada et al. | 455/566 |
| 6,192,356 B1 | * 2/2001 | Eyles | 706/58 |
| 6,351,761 B1 | * 2/2002 | Cantone et al. | 709/202 |
| 6,401,085 B1 | * 6/2002 | Gershman et al. | 707/4 |
| 2002/0022488 A1 | * 2/2002 | Srinivasan et al. | 455/456 |
| 2002/0049767 A1 | * 4/2002 | Bennett | 707/104.1 |

* cited by examiner

Primary Examiner—Nabil El-Hady
(74) Attorney, Agent, or Firm—Marilyn Smith Dawkins; Bracewell & Patterson, L.L.P.

(57) ABSTRACT

A method, system, and program are described in a client computer system for automatically processing information received by the client computer system from a server computer system over a network. A user utilizing a client computer system is permitted to subscribe to a service offered by a server computer system for pushing information to the client computer system. The information is pushed from the server computer to the client computer system at a time specified by the server computer system. The information is stored in the client computer system until a time specified by the client computer system. The information is automatically processed utilizing the client computer system without involvement by the user at the time specified by the client computer system. In various embodiments, the information can be automatically printed, faxed, or emailed utilizing the client computer system without involvement by the user at the time specified by the client computer system.

24 Claims, 4 Drawing Sheets

Push Options — 44

| Service | Push Permission Granted to: | Device | Time to send to Device |
|---|---|---|---|
| NY Times | www.nytimes.com | printer | 8:30 am daily |
| Washington Post | www.washingtonpost.com | fax | 8:35 am daily |
| | | | |

METHOD, SYSTEM, AND PROGRAM FOR AUTOMATICALLY PROCESSING PUSHED INFORMATION WITHOUT SUBSCRIBER INVOLVEMENT

BACKGROUND OF THE INVENTION

1. Technical Field

The present invention relates in general to data processing systems and, in particular, to a network of data processing systems including a client computer system coupled to a server computer capable of pushing information to the client computer system. Still more particularly, the present invention relates to a network of data processing systems including a client computer system coupled to a server computer capable of pushing information to the client computer system for processing the pushed information without subscriber involvement.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, and Aptiva series. Personal computer systems also includes handheld devices, such as palmtops, and cellular telephones.

Computer systems may be coupled together in a network, either a local, regional Intranet or through a wider, more global Internet. Users of these computer systems have the ability to transmit information to each other utilizing these networks.

Information may be "pushed" from a server computer system across a network to a client computer system. In "push" technology, a user first subscribes to a service provided through a particular Internet site. The Internet site typically offers a variety of information that the user might be interested in receiving. For example, daily newspapers are available from Internet sites. The user is then able to select to receive either the entire publication, or a portion of the publication. The Internet site will then automatically transmit the information the user has selected without further action by the user. In order to receive "pushed" information, the user's computer must be coupled to the Internet running a browser which is capable of receiving "pushed" information.

One problem with "push" technology is that the information is transmitted according to the server computer system's schedule. The information is stored on the client computer system after it is received. For the user to be able to access and read the information, the user must start an appropriate software program for accessing the information and viewing the information. This may be very inconvenient for the subscriber. For example, many people do not like to sit and read their morning newspaper on a computer screen. They would much rather read a paper copy of the newspaper printed on their home printer.

Using current "push" technology, if the subscriber wants a paper copy of the pushed information, the subscriber must access the information and then select the print function.

SUMMARY OF THE INVENTION

A method, system, and program are described in a client computer system for automatically processing information received by the client computer system from a server computer system over a network. A user utilizing a client computer system is permitted to subscribe to a service offered by a server computer system for pushing information to the client computer system. The information is pushed from the server computer to the client computer system at a time specified by the server computer system. The information is stored in the client computer system until a time specified by the client computer system. The information is automatically processed utilizing the client computer system without involvement by the user at a time specified by the client computer system. In various embodiments, the information can be automatically printed, faxed, or emailed utilizing the client computer system without involvement by the user at a time specified by the client computer system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF PREFERRED EMBODIMENT

A method, system, and program are described in a client computer system for automatically processing information received by the client computer system from a server computer system over a network. A user utilizing a client computer system is permitted to subscribe to a service offered by a server computer system for pushing information to the client computer system. The information is pushed from the server computer to the client computer system at a time specified by the server computer system. The information is stored in the client computer system until a time specified by the client computer system.

The information is automatically processed utilizing the client computer system without involvement by the user at the time specified by the client computer system. In one embodiment, the information is automatically printed utilizing the client computer system without involvement by the user at the time specified by the client computer system.

A print script exists within the client which is called upon the receipt by the client of pushed information. The print script determines the subscriber's print preferences. For example, the subscriber will have specified a time at which the client should print the pushed information. The print script then automatically prints the pushed information when this time occurs without the need for any intervention or further involvement by the subscriber.

In this manner, as an example, a subscriber could subscribe to a newspaper that is transmitted across a network, such as the Internet. The server responsible for transmitting the newspaper would transmit a copy of the types of articles the subscriber wishes to receive according to a schedule set by the server. Typically, the server will transmit these articles late each night. The subscriber's client computer system will receive the articles according to the schedule set by the server, and store the articles within the client. Upon receipt of the articles, the print script within the client will determine at what time the subscriber wishes to have the articles printed, for example each morning at 8:00 am. When the time occurs, the print script will then print the articles. The process is automated requiring no involvement by the user.

Figure 1:
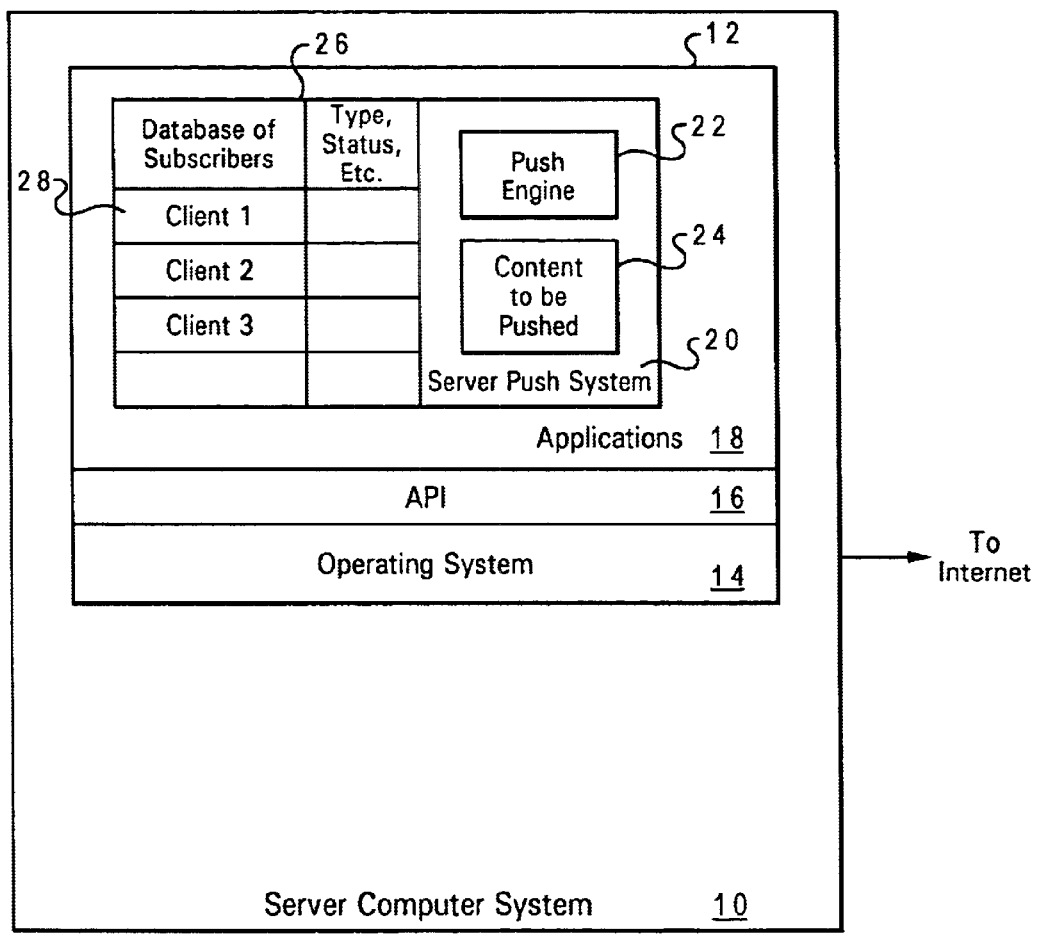
FIG. 1 depicts a server computer system capable of pushing information in accordance with the present invention.

FIG. 1 depicts a server computer system capable of pushing information in accordance with the present invention. Server computer system 10 is capable of "pushing" information across a network, such as the Internet. Server computer system 10 includes a software environment 12. Software environment 12 includes an operating system 14, an application program interface (API) 16, and an applications layer 18 where software applications reside.

A server push system 20 is included within applications layer 18. Server push system 20 includes a push engine 22 which is responsible for pushing information to recipients, content to be pushed 24 which is the actual information to be pushed to a recipient, and a database 26. Database 26 includes a listing of each client computer system which is to receive content 24. For example, database 26 includes a listing 28 which identifies clients 1, 2, and 3 which are to receive content 24. Status and other information, such as a type of information e.g. financial, sports, etc., may be maintained for each client included within listing 28.

Information may be obtained over the Internet utilizing one of several methods. One method for obtaining information is for a client computer system to "pull" the information. A client computer system "pulls" information by visiting a web site, selecting information, and downloading the information. A client "pulls" information according to the client's schedule, i.e. the client selects the time to initiate the transmission of the information from the server maintaining the web site to the client.

Another method for obtaining information is for a server computer system to "push" the information to a client computer system. For a client to receive "pushed" information, the client must subscribe to a service offered by a server. For example, often, newspapers or portions of newspapers are available to be pushed to clients. The client may specify the type of information the client wishes to receive. The server will then automatically transmit the selected information to the client according the server's schedule. The server selects the time to transmit the information to the client. For example, it may be more efficient for a server to transmit information late at night when fewer users are accessing the server.

Figure 2:
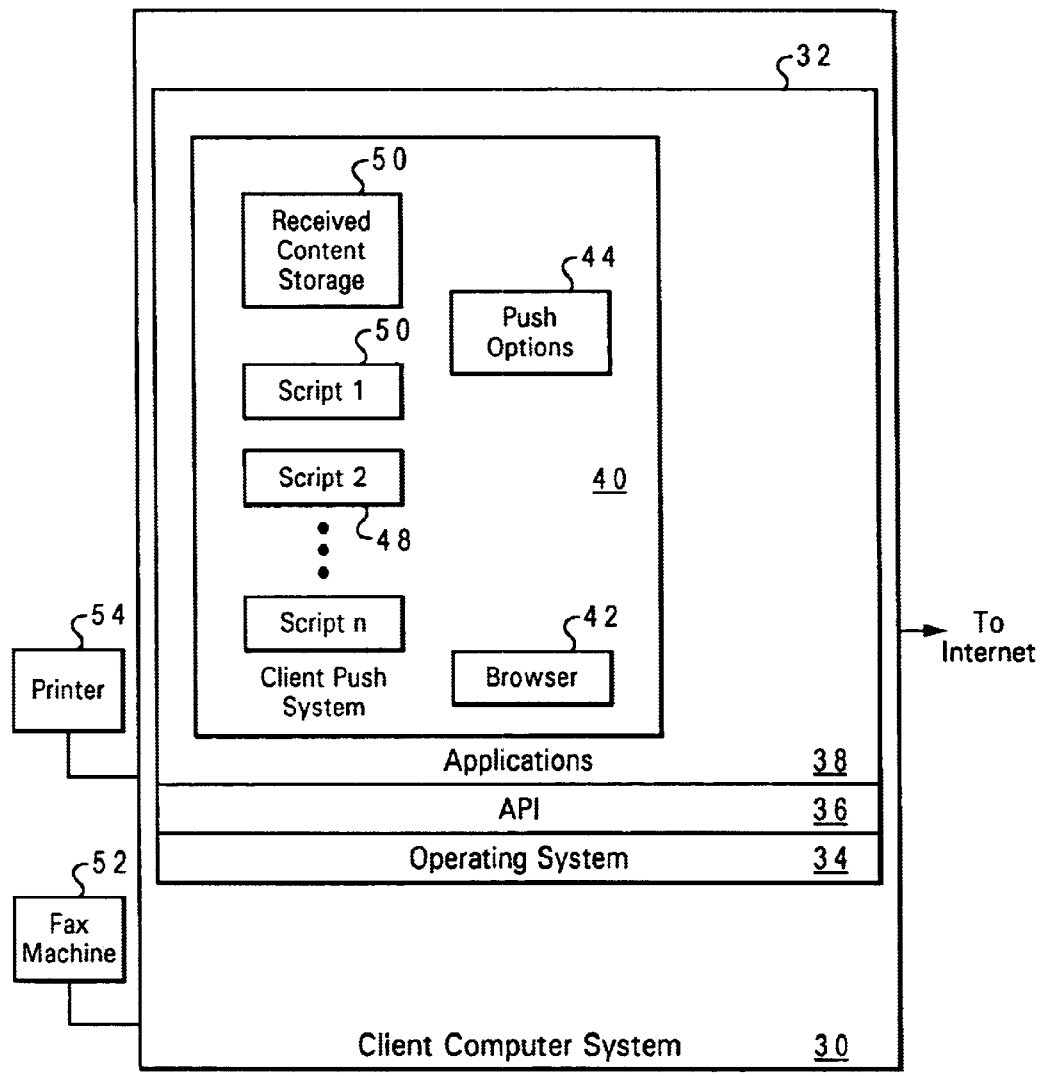
FIG. 2 illustrates a client computer system capable of automatically utilizing pushed information received from a server computer system in accordance with the present invention.

FIG. 2 illustrates a client computer system capable of automatically utilizing pushed information received from a server computer system in accordance with the present invention. Client computer system 30 is capable of receiving "pushed" information from a network, such as the Internet. Client computer system 30 includes a software environment 32. Software environment 32 includes an operating system 34, an application program interface (API) 36, and an applications layer 38 where software applications reside.

A client push system 40 is included within applications layer 38. Client push system 40 includes a browser 42 which is utilized accessing the Internet and viewing Internet documents. A user may specify push options 44 which includes information for automatically accessing content pushed from a server computer system. A storage area 50 is also included within client push system 40 for storing the content received from each subscription service.

Several scripts are included within client push system 40. The scripts are utilized by client push system 40 to automatically process the content pushed from server computer system 10. Included within a script is information regarding how the content is to be processed once it is received. A script is established for each service to which the user subscribes. For example, a user might subscribe to two services, where each of the services pushes the content of two different daily newspapers. Script 46 may then be established for first one of the services to automatically process the newspaper content received from that service. Script 48 may then be established for a second one of the services to automatically process the newspaper content received from that service.

A facsimile (FAX) machine 52 and a printer 54 are coupled to client 30. FAX machine 52 or printer 54 may be specified within a script to process pushed information received from server 10.

Figures 3, 5:
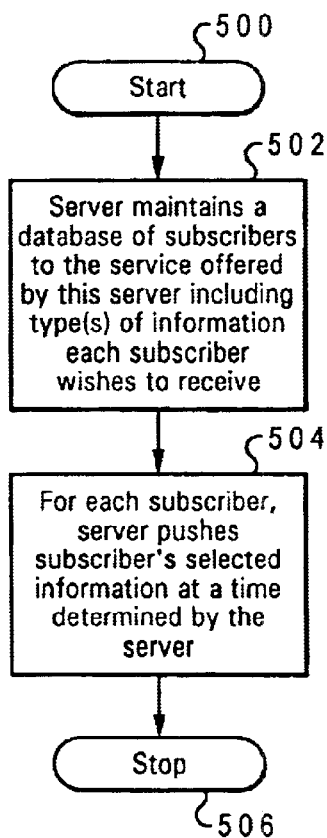
FIG. 3 illustrates a pictorial representation of push options included within a client computer system for specifying utilization of pushed information received from a server computer system in accordance with the present invention.
FIG. 5 depicts a high level flow chart which illustrates a server pushing selected information to a client subscriber in accordance with the present invention.

FIG. 3 illustrates a pictorial representation of push options 44 included within client computer system 30 for specifying utilization of pushed information received from server computer system 10 in accordance with the present invention. Push options 44 includes an identification of the services to which the user has subscribed, an Internet address 62 associated with each subscription service which has been given permission to push information to client 30, a device 64 to utilize to process the received pushed information, and a time 66 to send the received pushed information to device 64. A separate script will be created for each entry within push options 44.

For example, an entry 68 and an entry 70 are included within push options 44. A user has subscribed to two services. The first service will push a daily newspaper, such as the New York Times, to the user's computer system client 30. The second service will push a daily newspaper, such as the Washington Post, to client 30. Therefore, entry 68 identifies the New York Times as the service which has an Internet address of "www.nytimes.j.com". The user has selected to print the information received from the New York Times service at 8:30 am each day. Entry 70 identifies the Washington Post as the service which has an Internet address of "www.washingtonpost.com". The user has selected to fax the information received from the Washington Post service at 8:35 am each day.

Figure 4:
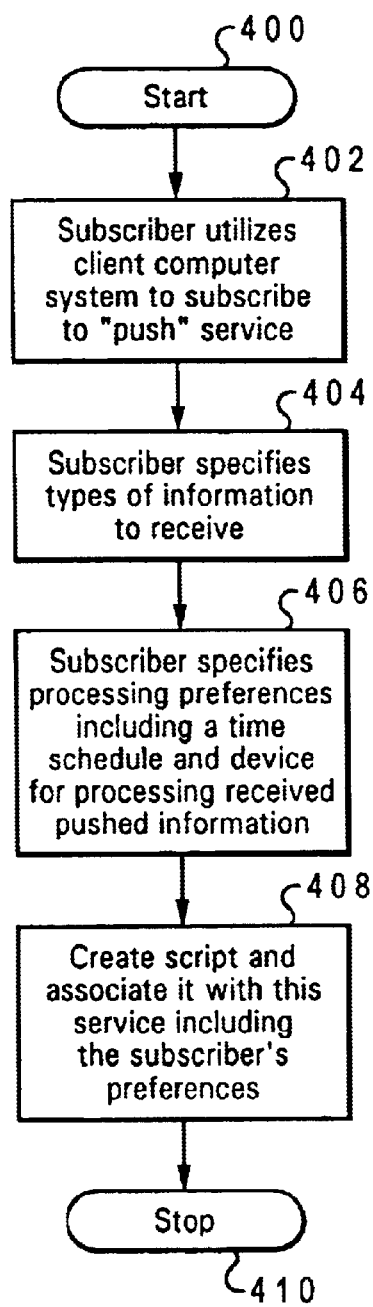
FIG. 4 illustrates a high level flow chart which depicts a client subscribing to a "push" service offered by a server computer system utilizing a network in accordance with the present invention.

FIG. 4 illustrates a high level flow chart which depicts a client subscribing to a "push" service offered by a server computer system utilizing a network in accordance with the present invention. The process starts as depicted by block 400 and thereafter passes to block 402 which illustrates a subscriber utilizing client computer system 30 to subscribe to a "push" service offered by server computer system 10 over a network, such as the Internet. The process then passes to block 404 which depicts the subscriber specifying particular types of information to receive. For example, the subscriber might wish to receive only the financial news published by a daily newspaper. Next, block 406 illustrates the subscriber utilizing client push system 40 to specify processing preferences which will include a time schedule and device for processing received pushed information. The preferences are specified as push options 44. Thereafter, block 408 depicts a script, such as script 46, being created and associated with this service. The script is stored within client push system 40. The process then terminates as illustrated by block 410.

FIG. 5 depicts a high level flow chart which illustrates a server pushing selected information to a client subscriber in accordance with the present invention. The process starts as depicted by block 500 and thereafter passes to block 502 which illustrates server computer system 10 maintaining database 26 of subscriber to the service offered by server 10. Database 26 includes the type of information each subscribed wishes to receive. Next, block 504 depicts server 10 pushing the selected type of information 24 for each subscriber included in database 26 to that subscriber's computer system. The information is transmitted to each client at a time determined by server computer system 10. The process then terminates as depicted by block 506.

Figure 6:
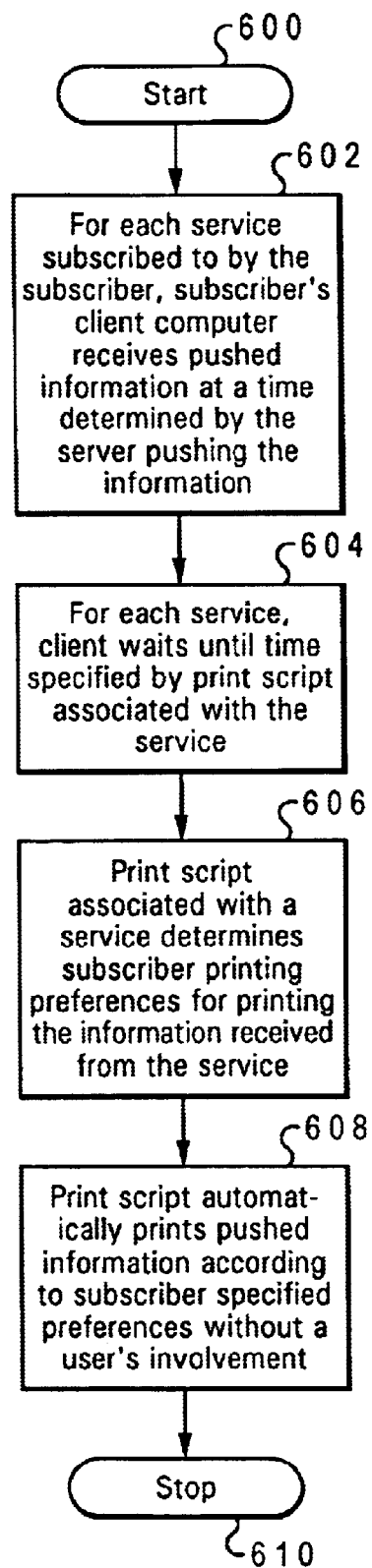
FIG. 6 illustrates a high level flow chart which depicts subscriber client computer system receiving pushed information and automatically processing the information according to the client's preferences without a user's involvement in accordance with the present invention.

FIG. 6 illustrates a high level flow chart which depicts subscriber client computer system receiving pushed information and automatically processing the information according to the client's preferences without a user's involvement in accordance with the present invention. The process starts as depicted by block 600 and thereafter passes to block 602 which illustrates for each service subscribed to by the subscriber, the subscriber's client computer 30 receiving pushed information 24 at a time determined by the server pushing the information. Pushed information 24 is stored in storage 50. Next, block 604 depicts for each service the user has subscribed to, client 10 waiting until the time specified by a script associated with the service. Upon the occurrence of the time specified by a script, block 606, then illustrates the script determining the preferences for processing the information pushed from the associated service. Thereafter, block 608 illustrates the script automatically processing the pushed information according to the subscriber's preferences specified in push options 44. The script automatically processes the information without the subscriber's involvement. The process then terminates as illustrated by block 610.

For example, the user may have established preferences such as push options 44. Client 10 will then wait until 8:30 am. At that time, script 46 associated with the New York Times service will determine the preferences included within entry 68 for device 64. After determining that the entry has specified printing, script 46 will send the information received from Internet address "www.nytimes.com" to printer 54 to be printed. At 8:35 am, script 48 associated with the Washington Post service will determine the preferences included within entry 70 for device 64. After determining that the entry has specified faxing, script 48 will send the information received from Internet address "www.washingtonpost.com" to fax machine 52 to be faxed.

A print script, a facsimile script, an email script, or other type of processing script may be utilized to process the received information. For example, a print script may be utilized to automatically print the received information at a time specified by the user. A facsimile script could be used to automatically transmit the received information as a facsimile transmission at a time specified by the subscriber to a recipient and telephone number specified by the subscriber. Similarly, an email script could be used to automatically transmit the received information as an electronic mail message at a time specified by the subscriber to a recipient and email address specified by the subscriber.

While the invention has been particularly shown and described with reference to a preferred embodiment, it will be understood by those skilled in the art that various changes in form and detail may be made therein without departing from the spirit and scope of the invention.

What is claimed is:

1. A method, in a data processing system, comprising:

receiving information from subscribed services pushed from a server computer at a time determined by said server computer system;

storing said information until a time specified by said data processing system; and automatically processing said information without involvement by a user at said time specified;

wherein a script is established for each service to which the user subscribes specifying a plurality of user preferences including specifying said time of automatically processing said information and a method for processing said information, and wherein the script is called upon in response to said receipt of said information.

2. The method according to claim 1, wherein the step of automatically processing said information without involvement by said user at said time specified further comprises the step of automatically printing said information.

3. The method according to claim 1, wherein the step of automatically processing said information without involvement by said user at said time specified further comprises the steps of:

calling a print script in response to said receipt of said information; and determining said time specified by said data processing system utilizing said print script.

4. The method according to claim 3, further comprising the step of automatically printing said information utilizing said print script at said time specified.

5. The method according to claim 1, wherein the step of automatically processing said information without involvement by said user at said time specified further comprises the steps of:

calling a mail script in response to said receipt of said information; and determining said time specified by said data processing system utilizing said mail script.

6. The method according to claim 5, further comprising the step of automatically transmitting said information as an electronic mail message utilizing said mail script at said time specified.

7. The method according to claim 1, wherein the step of automatically processing said information without involvement by said user at said time specified further comprises the steps of:
   calling a facsimile script in response to said receipt of said information; and
   determining said time specified by said data processing system utilizing said facsimile script.

8. The method according to claim 7, further comprising the step of automatically transmitting said information as a facsimile message utilizing said facsimile script at said time specified.

9. A data processing system, comprising:
   means for receiving information from subscribed services pushed from a server computer at a time determined by said server computer system;
   means for storing said information until a time specified by said data processing system; and
   means for automatically processing said information without involvement by said user at said time specified;
   wherein a script is established for each service to which the user subscribes specifying a plurality of user preferences including specifying said time of automatically processing said information and a method for processing said information, and wherein the script is called upon in response to said receipt of said information.

10. The system according to claim 9, wherein said means for automatically processing said information without involvement by said user at said time specified further comprises means for automatically printing said information.

11. The system according to claim 9, wherein said means for automatically processing said information without involvement by said user at said time specified further comprises:
   means for calling a print script in response to said receipt of said information; and
   means for determining said time specified by said data processing system utilizing said print script.

12. The system according to claim 11, further comprising means for automatically printing said information utilizing said print script at said time specified.

13. The system according to claim 9, wherein said means for automatically processing said information without involvement by said user at said time specified by further comprises:
   means for calling a mail script in response to said receipt of said information; and
   means for determining said time specified by said data processing system utilizing said mail script.

14. The system according to claim 13, further comprising means for automatically transmitting said information as an electronic mail message utilizing said mail script at said time specified.

15. The system according to claim 9, wherein means for automatically processing said information without involvement by said user at said time specified further comprises:
   means for calling a facsimile script in response to said receipt of said information; and
   means for determining said time specified by said data processing system utilizing said facsimile script.

16. The system according to claim 15, further comprising means for automatically transmitting said information as a facsimile message utilizing said facsimile script at said time specified.

17. A computer program product in a data processing system, comprising:
   instruction means for receiving information from subscribed services pushed from a server computer at a time determined by said server computer system;
   instruction means for storing said information until a time specified by said data processing system; and
   instruction means for automatically processing said information without involvement by said user at said time specified;
   wherein a script is established for each service to which the user subscribes specifying a plurality of user preferences including specifying said time of automatically processing said information and a method for processing said information, and wherein the script is called upon in response to said receipt of said information.

18. The computer program product according to claim 17, wherein said instruction means for automatically processing said information without involvement by said user at said time specified further comprises instruction means for automatically printing said information.

19. The computer program product according to claim 18, wherein said instruction means for automatically processing said information without involvement by said user at said time specified further comprises:
   instruction means for calling a print script in response to said receipt of said information; and
   instruction means for determining said time specified by said data processing system utilizing said print script.

20. The computer program product according to claim 19, further comprising instruction means for automatically printing said information utilizing said print script at said time specified.

21. The computer program product according to claim 17, wherein said instruction means for automatically processing said information without involvement by said user at said time specified further comprises:
   instruction means for calling a mail script in response to said receipt of said information; and
   instruction means for determining said time specified by said data processing system utilizing said mail script.

22. The computer program product according to claim 21, further comprising instruction means for automatically transmitting said information as an electronic mail message utilizing said mail script at said time specified.

23. The computer program product according to claim 17, wherein instruction means for automatically processing said information without involvement by said user at said time specified further comprises:
   instruction means for calling a facsimile script in response to said receipt of said information; and
   instruction means for determining said time specified by said data processing system utilizing said facsimile script.

24. The computer program product according to claim 23, further comprising instruction means for automatically transmitting said information as a facsimile message utilizing said facsimile script at said time specified.

* * * * *